UNITED STATES PATENT OFFICE.

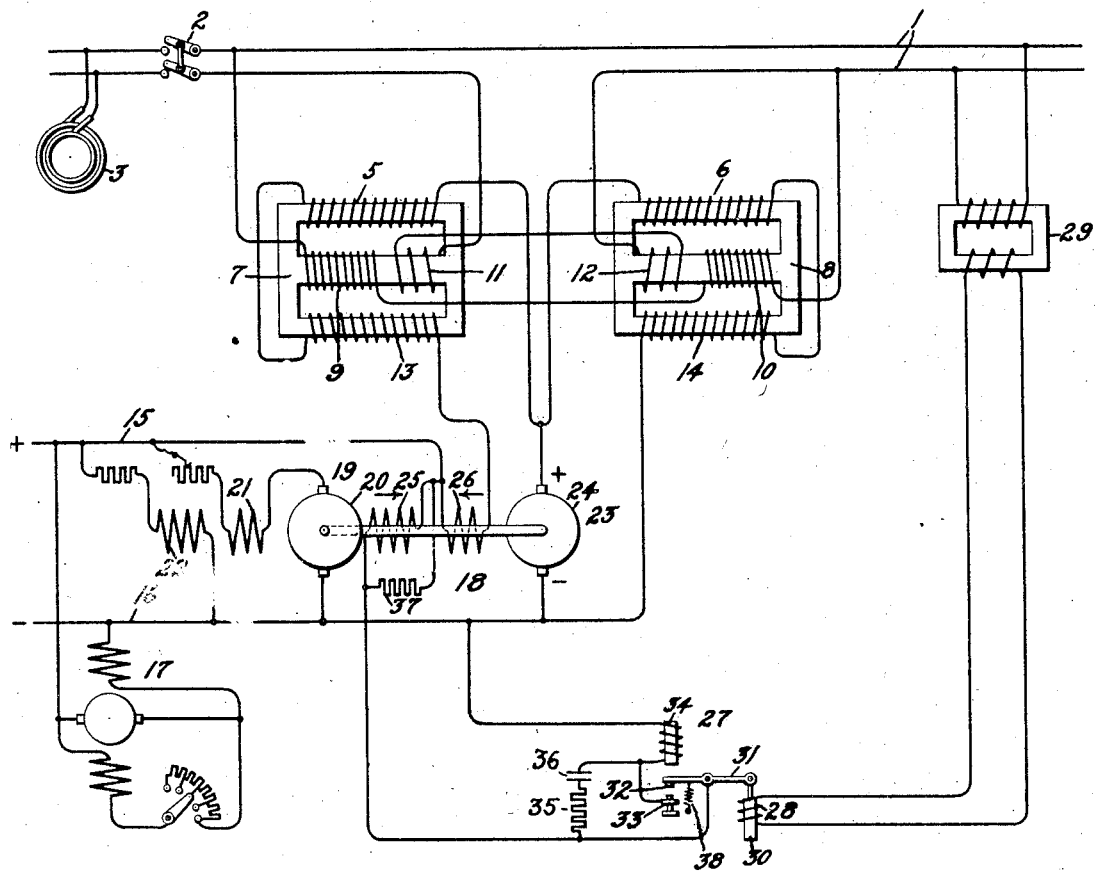

WALLACE B. KIRKE, OF SCHENECTADY, NEW YORK, ASSIGNOR TO GENERAL ELECTRIC COMPANY, A CORPORATION OF NEW YORK.

REGULATING SYSTEM FOR ALTERNATING-CURRENT CIRCUITS.

1,414,652.   Specification of Letters Patent.   Patented May 2, 1922.

Application filed June 10, 1920. Serial No. 388,041.

*To all whom it may concern:*

Be it known that I, WALLACE B. KIRKE, a citizen of the United States, residing at Schenectady, in the county of Schenectady, State of New York, have invented certain new and useful Improvements in Regulating Systems for Alternating-Current Circuits, of which the following is a specification.

My invention relates to regulating systems for alternating current circuits, and particularly to regulating systems of the type comprising a plurality of magnetic cores having windings thereon connected so as to modify the desired electrical conditions of the circuit to be regulated and means for developing in said cores a variable amount of unidirectional flux to regulate said electrical condition.

Heretofore it has been proposed to use counter electromotive force machines in series with the magnetizing windings on said cores and a vibratory device responsive to an electrical condition of said circuit for varying the excitation of said machines, the object of the counter electromotive force machines being to prevent fluctuation in the electrical condition being regulated due to the action of said device.

It has been found that the use of counter electromotive force machines for the above-mentioned purpose slows up the action of the regulator under certain conditions and also decreases the range of the regulator. Furthermore, where two electromotive force machines are used two contacts on the vibratory device are required which makes an appreciable movement of the vibrating arm of the device necessary, which in turn introduces an appreciable change in the voltage.

It is an object of my invention to provide a control arrangement for a regulating system of the type referred to whereby the action of the regulator is quick and accurate over its entire range and whereby the electrical condition being regulated is maintained much more nearly constant than has heretofore been possible.

My invention will be better understood from the following description taken in connection with the accompanying drawing and its scope will be pointed out in the appended claims.

Referring to the drawing, which diagrammatically shows one embodiment of my invention as applied to a single phase alternating current circuit, 1 denotes a single phase alternating current circuit adapted to be connected by means of a switch 2 to a single phase source of current 3. 5 and 6 represent transformers provided with magnetic cores 7 and 8, primary windings 9 and 10, secondary windings 11 and 12, and magnetizing windings 13 and 14 respectively.

The primary windings 9 and 10 are connected in series with each other in a circuit connected in multiple with the circuit 1. The secondary windings 11 and 12 are connected in series with the circuit 1. The primary winding 9 and the secondary winding 11 of the transformer are so connected that the electromotive force induced in the secondary winding 11 bucks the voltage of the circuit 1. The primary winding 10 and the secondary winding 12 of the transformer 6 are so connected that the electromotive force induced in the secondary winding 12 boosts the voltage of the circuit 1.

The magnetizing winding 13 which is arranged on the core 7 and the magnetizing winding 14 which is arranged on the core 8 are each disposed so that the voltages induced therein by the alternating current flux in the core are substantially neutralized. As illustrated, this neutralization is accomplished by arranging an equal portion of the winding 13 and of the winding 14 oppositely with respect to the alternating current flux, although numerous other ways of accomplishing this result will be obvious to those skilled in the art. The magnetizing windings 13 and 14 are connected in series with each other across the buses 15 and 16 which may be supplied with current from the direct current generator 17 or any other suitable source of current.

18 represents a motor-generator set comprising a compound wound motor 19 having an armature 20 connected across the buses 15 and 16, a series field winding 21 and a shunt field winding 22 and a direct current generator 23 having an armature 24 connected across the terminals of the magnetizing winding 14, a main field winding 25 and a differential field winding 26 connected in series with the magnetizing winding 13. The generator 23 is so connected that the voltage thereof opposes the voltage across the mains 15 and 16 and is so designed that its voltage is substantially equal to the voltage across the buses 15 and 16 when the field winding 25 is fully energized.

27 denotes a vibratory device comprising a winding 28 connected by means of the potential transformer 29 to the circuit 1, a core 30 actuated by said winding, a movable arm 31, a contact 32 carried by said arm and a stationary contact 33 cooperating with the contact 32. The movable contact 32 is electrically connected to one end of the main field winding 25, the other end of which is connected to the bus 15. The stationary contact 33 is connected to the bus 16 in series with an anti-hunting winding 34. This anti-hunting winding when energized attracts the movable arm 31 thereby tending to disengage the contacts 32 and 33. In order to prevent sparking, I connect the resistance 35 and the condenser 36 to the contacts 32 and 33 and also connect the discharge resistance 37 across the terminals of the field winding 25. An adjustable spring 38 may be employed for adjusting the operation for the arm 31 of the vibratory device 27.

The transformers 5 and 6 are designed and constructed to have sufficient boosting and bucking capacity to accomplish the desired regulation of the circuit 1 over the normal range of load thereon. While I have shown the primary windings 9 and 10 as being connected to the circuit 1 between the point where the series windings 11 and 12 are connected in the circuit 1 and the load, it will be evident that the primary windings may be connected to the circuit 1 between the generator 3 and the point where the series windings 11 and 12 are connected to the circuit 1. The vibrator device 27 may be adjusted by means of the adjustable spring 38 so that upon the voltage of the circuit 1 increasing above the predetermined value the core 30 will be raised thereby engaging contacts 32 and 33 and upon the voltage of the circuit 1 decreasing below said predetermined desired value, the core will be lowered, thereby disengaging contacts 32 and 33.

The operation of the embodiment of my invention shown in the drawing is as follows:

Assume that the switch 2 is closed and the circuit 1 is drawing current from the source 3. Also assume that the direct current buses 15 and 16 are energized from the generator 17 so that the motor-generator set 18 is running at a predetermined speed, which remains substantially constant. First, suppose that the voltage of the circuit 1 is below the desired predetermined value. The core 30 will then be in its lower position so that the contacts 32 and 33 will be disengaged. The field winding 25 will be deenergized and, therefore, the voltage of the generator 23 will be decreased, thereby decreasing the current in the magnetizing winding 14. The differential winding 26 neutralizes any residual magnetism in the field circuit of the generator 23 so that the voltage of the generator may be reduced to zero. The current through the magnetizing winding 13 however, will have a relatively high value. Under these conditions, the secondary winding 12 of the transformer 6 will exert substantially its full boosting effect upon the circuit 1, whereas the secondary winding 11 of the transformer 5 will exert substantially no bucking effect upon the circuit 1, because, with a relatively large current in the winding 13 of the transformer 5 and a relatively small current in the winding 14 of the transformer 6, the voltage across the primary winding 7 is very small whereas the voltage across the primary winding 10 is approximately the voltage of the circuit 1. An excessive current does not flow through the primary winding 9 because the primary winding 10, the impedance of which is high at this time, is connected in series therewith.

Now suppose that the voltage of the circuit 1 is above the desired predetermined value. The core 30 will then be in its upper position so that the contacts 32 and 33 will be in engagement, thereby completing the circuit through the field winding 25 of the generator 23 and the anti-hunting winding 34. The energization of the anti-hunting winding 34 attracts the movable arm 31 which is of magnetic material, thereby tending to disengage the contacts 32 and 33 so as to prevent shunting, which would occur by reason of the time lag of the system if no such device were provided. The energization of the field winding 25 causes the voltage generator 23 to build up. Since the voltage of the generator 23 opposes the voltage of the mains 15 and 16, an increase in the generator voltage decreases the current in the magnetizing winding 13 of the transformer 5 and increases the current through the magnetizing winding 14 of the transformer 6. Under these conditions, therefore, the secondary winding 12 of the transformer 6 will exert substantially no boosting effect upon the circuit 1, and the secondary winding 11 of the transformer 5 will exert substantially full bucking effect upon the circuit 1 because with a high current in the magnetizing winding 14 of the transformer 6, and a small current in the winding 13 of the transformer 5, the voltage across the primary winding 8 is small whereas the voltage across the primary winding 9 is approximately the voltage of the circuit 1. It will be noted that the impedance of the primary winding 9 which is high at this time limits the amount of current flowing through the primary winding 10 and prevents this current from becoming excessive.

Although the action of the system, when the voltage is above and below the desired predetermined value has been described, it will be understood that the vibratory device 27 will normally be in rapid vibration and through the regulation of the field winding 25 will cause the currents in the magnetizing windings 13 and 14 to have such relative values as to maintain the voltage of the circuit 1 substantially constant. The vibratory device 27 is designed and adjusted so that it is very sensitive to the conditions in the circuit 1 and will, therefore, have a high rate of vibration. The generator 23 which is interposed between the vibratory device 27 and the magnetizing windings 13 and 14 of the transformers 5 and 6 prevents abrupt variations in the currents in the windings 13 and 14 corresponding to the individual vibrations of the vibratory device 27, but will regulate the current in the windings 13 and 14 in accordance with the average effect of consecutive vibrations of the vibratory device. Since the vibratory device 27 is very sensitive to conditions in the circuit 1, the regulation of the circuit 1 will be sensitive and quick notwithstanding the interposition of the generator 23 between the vibratory device 27 and the magnetizing windings 13 and 14.

Although my invention is illustrated as applied to a single phase alternating current circuit, it will be apparent to those skilled in the art how it may be applied to polyphase alternating circuits.

While I have shown one embodiment of my invention I do not desire to be limited to the particular arrangement shown and described, but seek to cover in the appended claims all those modifications which fall within the spirit and scope of my invention.

What I claim as new and desire to secure by Letters Patent of the United States, is:—

1. The combination with an alternating current circuit of means for regulating an electrical condition thereof comprising a plurality of magnetic cores, windings thereon connected to modify said electrical condition, magnetizing windings on said cores, and means for supplying said magnetizing windings with different values of direct current, said means comprising a source of direct current connected in series with said magnetizing windings, a second source of direct current connected to the terminals of one of said magnetizing windings, and means responsive to an electrical condition of said alternating current circuit for varying the voltage of said second source.

2. The combination with an alternating current circuit of means for regulating an electrical condition thereof comprising a plurality of magnetic cores, windings thereon connected to modify said electrical condition, magnetizing windings on said cores, and means for supplying said magnetizing windings with different values of direct current, said means comprising a source of direct current connected in series with said magnetizing windings, a generator connected to the terminals of one of said magnetizing windings, means for driving said generator, and means responsive to an electrical condition of said alternating current circuit for varying the excitation of said generator.

3. The combination with an alternating current circuit, of means for regulating an electrical condition thereof comprising a plurality of magnetic cores, windings thereon connected to modify said electrical condition, magnetizing windings on said cores and means for supplying said magnetizing windings with different values of direct current, said means comprising a source of direct current connected in series with said magnetizing windings, a direct current generator having its armature winding connected to the terminals of one of said magnetizing windings, a main field winding and a differential field winding connected in series with another of said magnetizing windings, and vibratory means responsive to an electrical condition of said alternating current circuit for varying the current in said main field winding.

4. The combination with an alternating current circuit, of means for regulating an electrical condition thereof comprising a plurality of magnetic cores, windings thereon connected to modify said electrical condition, magnetizing windings on said cores, and means for supplying said magnetizing windings with different values of direct current, said means comprising a source of direct current connected in series with said magnetizing windings, a generator having an armature winding connected to the terminals of one of said magnetizing windings, and a field winding, a vibratory device responsive to an electrical condition of said alternating current circuit for opening and closing the circuit through said field winding, and a discharge resistance connected across the terminals of said field winding.

In witness whereof, I have hereunto set my hand this 9th day of June, 1920.

WALLACE B. KIRKE.